(12) United States Patent
Chao

(10) Patent No.: US 8,775,968 B2
(45) Date of Patent: Jul. 8, 2014

(54) METHOD OF CONTROLLING DISPLAY PROPERTIES AND PRIORITIES OF WINDOWS

(71) Applicant: AmTRAN Technology Co., Ltd, New Taipei (TW)

(72) Inventor: Kuang-Cheng Chao, New Taipei (TW)

(73) Assignee: AmTRAN Technology Co., Ltd, Jhonghe District, New Taipei (TW)

( * ) Notice: Subject to any disclaimer, the term of this patent is extended or adjusted under 35 U.S.C. 154(b) by 0 days.

(21) Appl. No.: 13/873,262

(22) Filed: Apr. 30, 2013

(65) Prior Publication Data

US 2014/0096158 A1 Apr. 3, 2014

(30) Foreign Application Priority Data

Sep. 28, 2012 (TW) ............................... 101136001 A

(51) Int. Cl.
| G06F 3/048 | (2013.01) |
| G06F 3/00 | (2006.01) |
| G06F 3/0481 | (2013.01) |
| G06F 3/14 | (2006.01) |
| G06F 9/44 | (2006.01) |
| H04N 5/445 | (2011.01) |
| H04N 5/45 | (2011.01) |
| G09G 5/14 | (2006.01) |
| H04N 21/482 | (2011.01) |
| H04N 21/84 | (2011.01) |
| H04N 21/4722 | (2011.01) |
| H04N 21/431 | (2011.01) |

(52) U.S. Cl.
CPC ............ *G06F 3/0481* (2013.01); *G06F 3/1423* (2013.01); *G06F 9/4443* (2013.01); *H04N 5/44543* (2013.01); *G09G 5/14* (2013.01); *G06F 3/14* (2013.01); *H04N 21/482* (2013.01); *H04N 21/84* (2013.01); *H04N 21/4722* (2013.01); *H04N 5/44513* (2013.01); *H04N 5/45* (2013.01); *H04N 21/4316* (2013.01)
USPC ........... 715/802; 715/761; 715/767; 715/794; 715/797; 725/43; 725/37; 725/40; 725/61; 348/563; 348/564; 348/565

(58) Field of Classification Search
CPC . H04N 21/482; H04N 21/84; H04N 5/44543; H04N 21/4722; H04N 5/44513; H04N 5/45; H04N 21/4316; G06F 3/1423; G06F 9/443; G06F 3/0481; G06F 3/13; G09G 5/14
USPC .......... 725/37, 40, 43, 61; 715/761, 767, 802, 715/794, 797; 348/563, 564, 565
See application file for complete search history.

(56) References Cited

U.S. PATENT DOCUMENTS

| 2001/0029609 A1* | 10/2001 | Tanigawa et al. ................ 725/40 |
| 2012/0005606 A1* | 1/2012 | Dewa et al. .................... 715/767 |
| 2013/0104065 A1* | 4/2013 | Stecher .......................... 715/767 |

OTHER PUBLICATIONS

Apple Inc., Window Layering and Types of Windows, Nov. 27, 2009.*

* cited by examiner

*Primary Examiner* — Hoang-Vu A Nguyen-Ba
(74) *Attorney, Agent, or Firm* — Winston Hsu; Scott Margo

(57) ABSTRACT

A method of controlling a display includes displaying a first window on the display, setting the first window to receive commands, and displaying a second window on the display. When the second window is displayed, a portion of the first window is kept being displayed, and the first window is kept being set to receive commands.

10 Claims, 8 Drawing Sheets

METHOD OF CONTROLLING DISPLAY PROPERTIES AND PRIORITIES OF WINDOWS

BACKGROUND OF THE INVENTION

1. Field of the Invention

The present invention relates to a method of controlling a display, especially a method enabling a display window to continue displaying contents and receiving commands.

2. Description of the Prior Art

In order to enhance entertainment features and practicality of televisions, Smart TVs are gradually becoming popular. Smart TVs usually have interfaces capable of linking to internet, and can display launchers for operating by users to activate internet streaming application programs, such as Youtube or other application programs.

However, as to currently available smart TVs, multiple user control options in a launcher respectively correspond to multiple application programs. Thus, selecting one of these user control options may call a corresponding one of the application programs, and there will be a main window displayed after activating each application program. When multiple windows are called sequentially, the later selected window will have higher display priority and higher window focus (input taking) priority. That is, the latest selected window will cover the previous selected windows and receive commands input to the smart TV by a user through remote controller. Meanwhile, the commands will not be received by previously selected windows.

Furthermore, letting a window always be located at the top of a screen will make the window have the highest display priority, and the window will always be above other windows having ordinary display priorities, in which the window is a so-called "always on top window". However, the always on top window only keeps the highest display priority, and can not keep the highest focus taking priority. That is, though the always on top window can be displayed at the top of the screen lastingly, it cannot receive commands from the user anymore. It requires extra operating by the user for the always on top window to receive commands.

SUMMARY OF THE INVENTION

An embodiment of the present invention relates to a method of controlling a display. The method comprises displaying a first window on the display, setting the first window to receive commands, selecting a first user control option of the first window when the display displays the first window, and activating and displaying a second window corresponding to the first user control option when the first user control option is selected. A Display priority of the first window is higher than a display priority of the second window, and a window focus priority of the first window is higher than a window focus priority of the second. When the second window is displayed, an area previously displaying the first window is kept to display contents of the first window, and the first window is still set to receive commands.

Another embodiment of the present invention relates to a method of controlling a television (TV). The method comprises remotely controlling the TV to display a first window and setting the first window to receive commands, remotely selecting a first user control option of the first window by when the TV is displaying the first window, and activating and displaying a second window corresponding to the first user control option when the first user control option is selected. A Display priority of the first window is higher than a display priority of the second window, and a window focus priority of the first window is higher than a window focus priority of the second. When the second window is displayed, an area previously displaying the first window is kept to display contents of the first window, and the first window is still set to receive commands.

Through the configurations in the embodiments of the present invention, the first window will not be hidden even when the display is displaying the second window. Thus, the user can control the display through inputting commands to the first window while viewing the second window. Besides, since the first window will not automatically disappear, the user can directly and quickly input commands to the first window. If the user does not want to further input commands to the first window, he may decide the timing of hiding the first window. Moreover, the display of the present invention can be a television including a remote, and the user can remotely operate the television.

These and other objectives of the present invention will no doubt become obvious to those of ordinary skill in the art after reading the following detailed description of the preferred embodiment that is illustrated in the various figures and drawings.

DETAILED DESCRIPTION

Some phrases are referred to specific elements in the present specification and claims, please notice that the manufacturer might use different terms to refer to the same elements. However, the definition between elements is based on their functions instead of their names. Further, in the present specification and claims, the term "comprising" is open type and should not be viewed as the term "consisted of." Besides, the term "electrically coupled" can be referred to either directly connecting or indirectly connecting between elements.

In the methods and devices of the embodiments of the present invention, commands from a user are received by the built-in software or firmware of the display, and then a state of the display and displayed images are changed accordingly. However, the present invention is not limited to embodiments recited herein. Furthermore, the display may also be controlled by the operating system or software of a computer device through connecting to the computer device.

Figure 1:
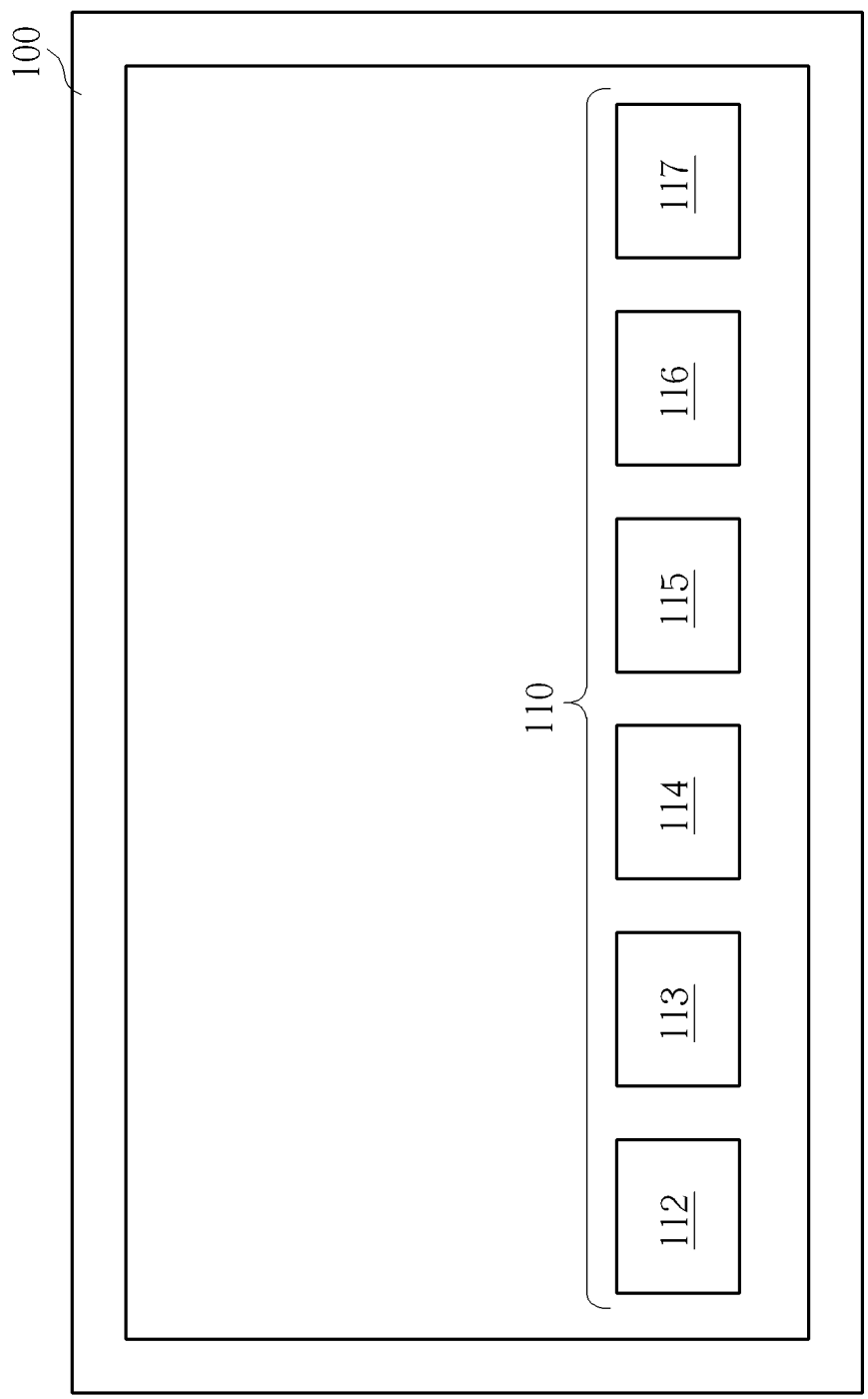
FIG. 1 shows the display of the present invention displaying windows.
Figure 2:
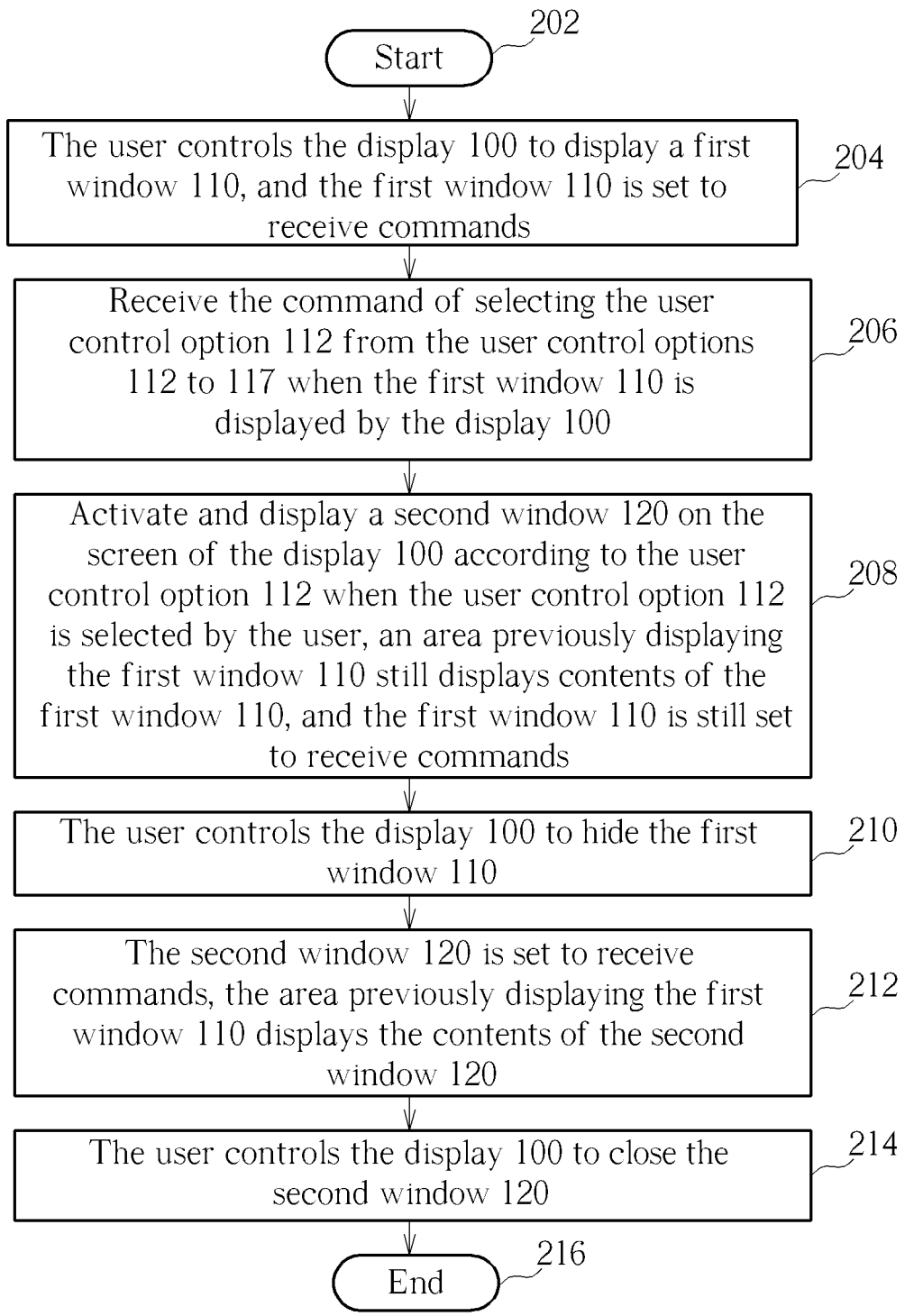
FIG. 2 is a flow chart of controlling the display in FIG. 1 according to a first embodiment of the present invention.

Please refer to FIGS. 1 and 2. FIG. 1 shows the display 100 of the present invention displaying windows. The screen of the display 100 can be used to display a first window 110, and the first window can display a plurality of user control options 112 to 117. For example, the user control option 112 can be an application program corresponding to Youtube. The display 100 will correspondingly activate and display Youtube application program after the user control option 112 is selected, and a corresponding main window will be shown thereafter. The user control options 113 to 117 can be options corresponding to the display settings or other application programs. FIG. 2 is a flow chart of controlling the display 100 in FIG. 1 according to a first embodiment of the present invention. Steps of FIG. 2 are as follows.

Step 202: start;

Step 204: the user controls the display 100 to display a first window 110, and the first window 110 is set to receive commands;

Step 206: receive the command of selecting the user control option 112 from the user control options 112 to 117 when the first window 110 is displayed by the display 100;

Step 208: activate and display a second window 120 on the screen of the display 100 according to the user control option 112 when the user control option 112 is selected by the user, an area previously displaying the first window 110 still displays contents of the first window 110, and the first window 110 is still set to receive commands;

Step 210: the user controls the display 100 to hide the first window 110;

Step 212: the second window 120 is set to receive commands, the area previously displaying the first window 110 displays the contents of the second window 120;

Step 214: the user controls the display 100 to close the second window 120;

Step 216: end.

In Step 204, after the display 100 is turned on, the user inputs a commend to the display 100 such that the first window 110 is displayed on the display 100. The first window 110 is not limited to only comprise the user control options 112 to 117, but can comprise more user control options. The user control options can be shown one by one through horizontally scrolling the user control options. After the first window 110 is shown, the first window is set by the software or the firmware of the display 100 to be in a window focus (on focus) state. In Step 206, the user can select the user control option 112 from the currently displayed user control options 112 to 117. Thus, in Step 208, the display 100 will accordingly activate and display the second window 120 corresponding to the user control option 112, which is shown in FIG. 3.

Please notice that, in the present embodiment, the second window 120 is activated and shown in response to the user control option 112 of the first window 110. However, in other modifications and applications, the second window 120 can also be directly activated and displayed through directly selecting one of options, icons or buttons on a remote controller by a user. That is, it does not have to activate and display windows through the user control option 112 or other options in the first window 110, and such modifications may be applied to the following embodiments.

Figure 3:
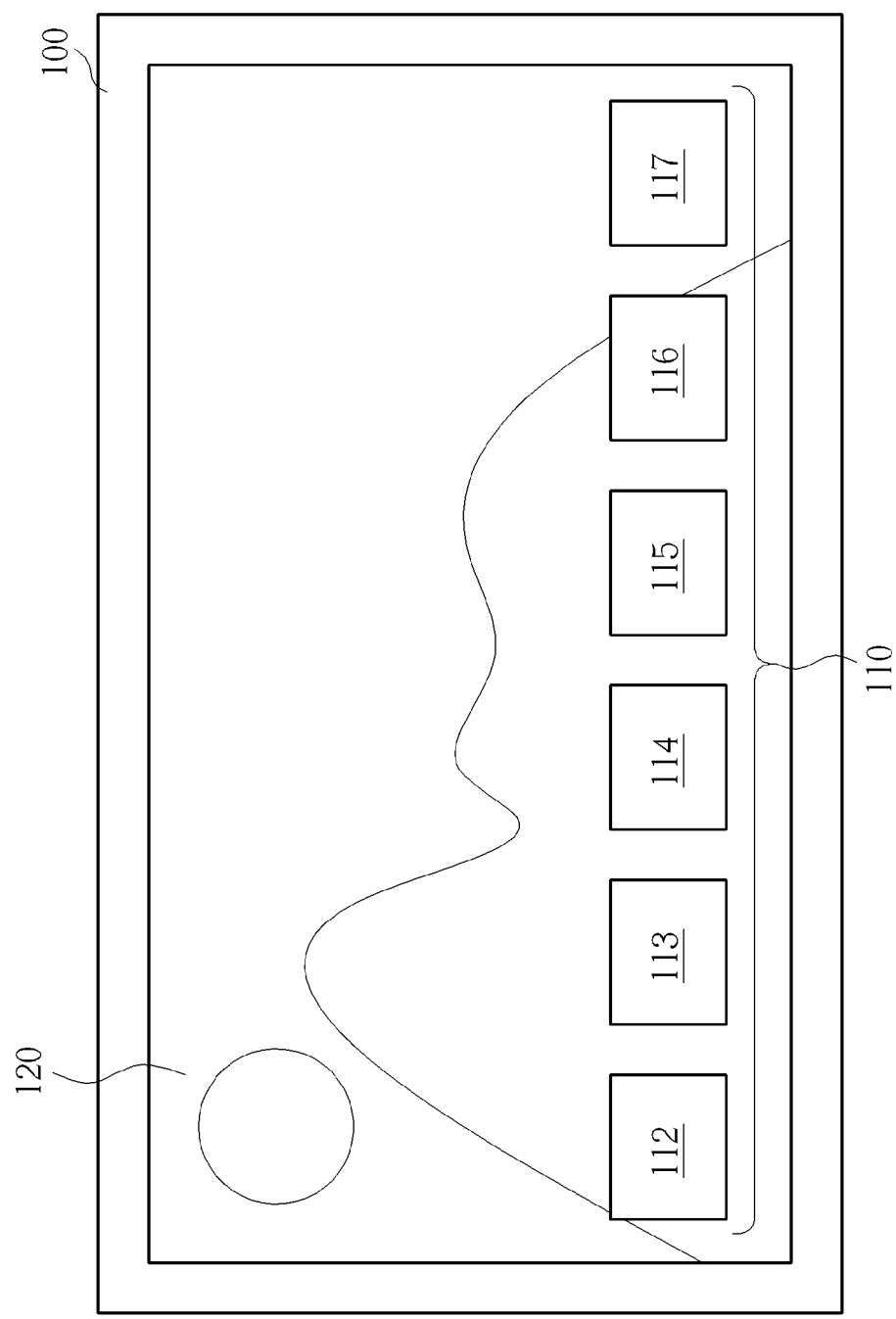
FIG. 3 shows the display simultaneously displaying the first and second windows according to the steps shown in FIG. 2.

Please refer to FIG. 3, which shows the display 100 simultaneously displaying the first window 110 and the second window 120 according to the steps shown in FIG. 2. In Step 208, the display priority of the first window 110 is higher than that of the second window 120, and the window focus priority of the first window 110 is higher than that of the second window 120. Besides, as shown in FIG. 3, when the second window 120 is shown on the screen of the display 100, the window area of the first window 110 will still display contents of the first window 110, and the first window 110 is still set to receive commands. That is, even after the second window 120 is displayed, the first window 110 will not be overlaid by the second window 120, and will remain in the state of receiving commands. Thus, the user can operate the first window 110 while the second window 120 is displayed. When the user does not need to operate the first window 110, the user can further input commands to the display 100 to have the first window no longer receive commands and disappear from the screen of the display 100 until the user inputs commands again to recall the first window 110. For example, in Step 210, the user controls the display 100 to hide the first window 110. In Step 212, after the first window 110 is hidden, the second window 120 will receive commands and the area previously displaying the first window 110 will be fully used to display the second window 120 instead of displaying the first window 110. In Step 214, after the user controls the display 100 to close the second window 120, the second window 120 will not be displayed and can not receive commands.

Through setup of the first embodiment, the first window 110 will not disappear as the display 100 displays the first window 110, the user therefore can input commands to the first window to operate the display 100 while viewing contents of the second window 120. After the first window 110 is popped up, the first window 110 will not automatically disappear, thus the user can directly and quickly input commands to the first window 110. And if the user need not input commands to the first window 110, the user can decide the timing of hiding the first window 110.

Figure 4:
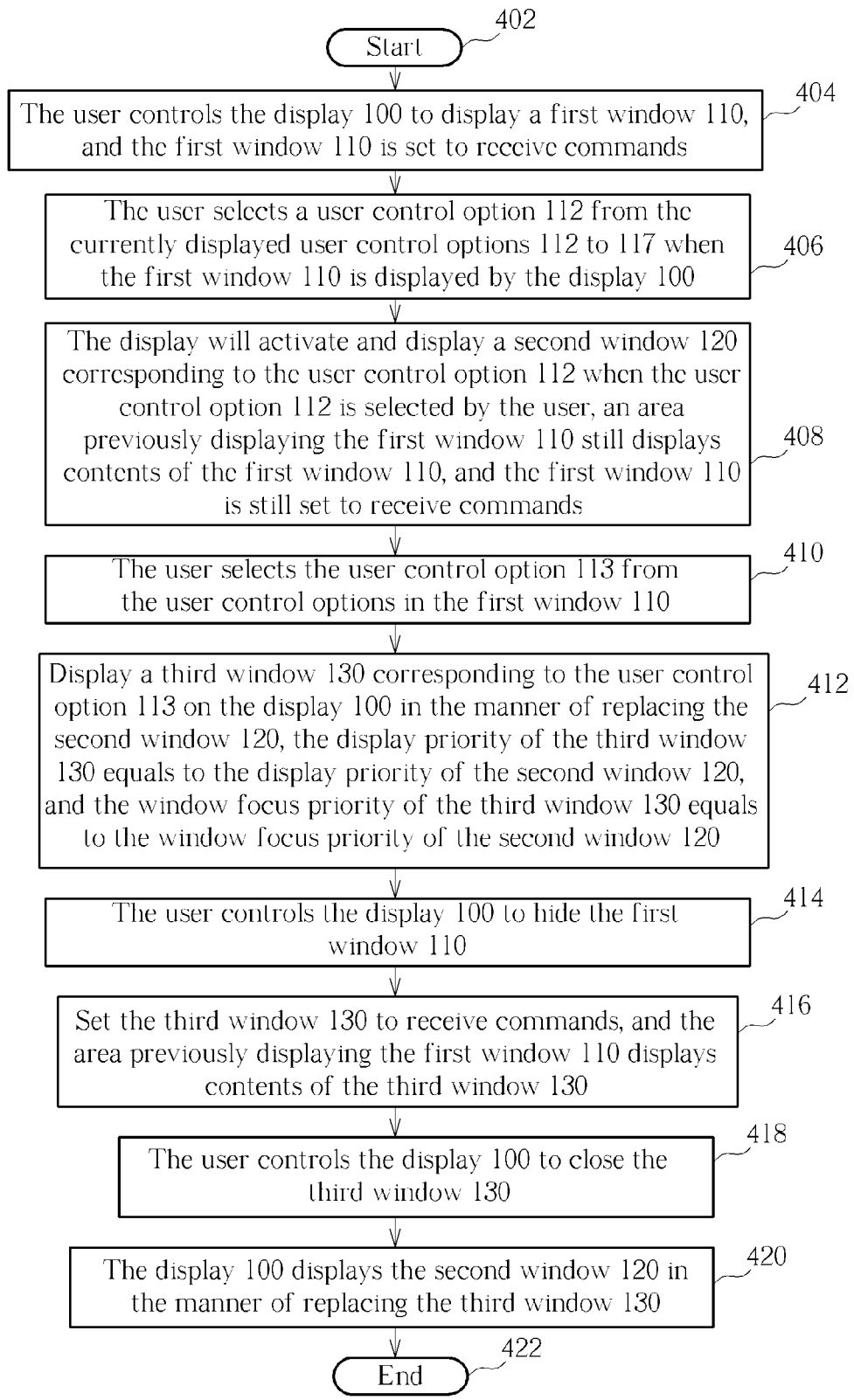
FIG. 4 is a flow chart of controlling the display in FIG. 1 according to a second embodiment of the present invention.
Figure 5:
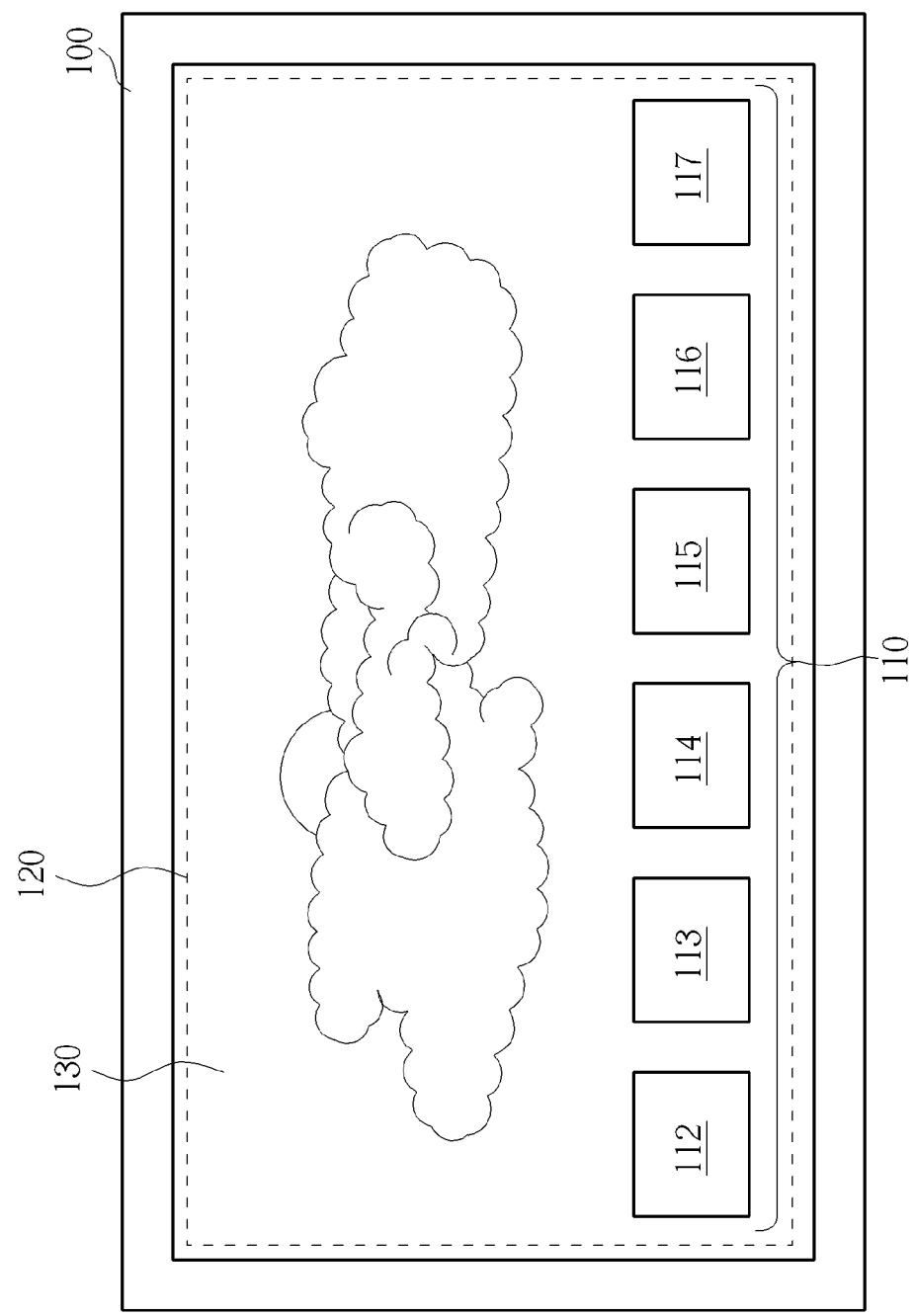
FIG. 5 shows the display displaying the first, second and third windows according to the steps shown in FIG. 4.

Please refer to FIGS. 4 and 5. FIG. 4 is a flow chart of controlling the display in FIG. 1 according to a second embodiment of the present invention, and FIG. 5 shows the display 100 displaying the first window 110, the second window 120 and third window 130 according to steps shown in FIG. 4. Steps of FIG. 4 are as follows.

Step 402: start;

Step 404: the user controls the display 100 to display a first window 110, and the first window 110 is set to receive commands;

Step 406: the user selects a user control option 112 from the currently displayed user control options 112 to 117 when the first window 110 is displayed by the display 100;

Step 408: the display will activate and display a second window 120 corresponding to the user control option 112 when the user control option 112 is selected by the user, an area previously displaying the first window 110 still displays contents of the first window 110, and the first window 110 is still set to receive commands;

Step 410: the user selects the user control option 113 from the user control options in the first window 110;

Step 412: display a third window 130 corresponding to the user control option 113 on the display 100 in the manner of replacing the second window 120, the display priority of the third window 130 equals to the display priority of the second window 120, and the window focus priority of the third window 130 equals to the window focus priority of the second window 120;

Step 414: the user controls the display 100 to hide the first window 110;

Step 416: set the third window 130 to receive commands, and the area previously displaying the first window 110 displays contents of the third window 130;

Step 418: the user controls the display 100 to close the third window 130;

Step 420: the display 100 displays the second window 120 in the manner of replacing the third window 130;

Step 422: end.

The second embodiment describes the scenario where the user switches multiple windows in response to multiple user control options. Similar to Steps 202 to 208, in Steps 402 to 408, the user firstly selects the user control option 112 and views the second window 120 corresponding to the user control option 112. The first window 110 still receives commands while the second window 120 is being displayed. In Step 410, the user further selects the user control option 113 from the first window 110 when the second window 120 is displayed. In Step 412, the software or firmware applied to the display 100 will enable displaying of the third window 130 corresponding to the user control option 113 on the display 100 in the manner of replacing the second window 120. At this time, contents of the second window 120 will be fully overlaid by contents of the third window 130. Since the third window 130 is opened later than the second window 120, the user cannot see contents of the second window 120 and can only see contents of the third window 130. Meanwhile, the first window 110 remains being displayed and receiving commands. In Step 414, the user inputs commands to and controls the display 100 to hide the first window 110. In Step 416, the first window 110 no longer receives commands and the third window 130 will be set to receive commands. Since the first window 110 is hidden, the area previously displaying the first window 110 will display contents of the third window 130. In Step 418, the user inputs commands to and controls the display 100 to close the third window 130. In Step 420, the display 100 displays the second window 120 in the manner of replacing the third window 130. That is, the display 100 will display the second window 120 as previously displayed in Step 408.

Through setup of the second embodiment, the first window 110 will not disappear as the display 100 displays the first window 110, the user therefore can input commands to the first window 110 to operate the display 100 while contents of the second window 120 is displayed. Hence, the user can select the user control option 113 to pop up and display the third window 130 corresponding to the user control option 113. Since the first window 110 will not automatically disappear, the user can directly and quickly input commands to the first window 110 to close the third window 130 and display the previous second window 120 without continuing display of the third window 130. Further, if the user need not input commands to the first window 110, the user can decide the timing to hide the first window 110.

Figure 6:
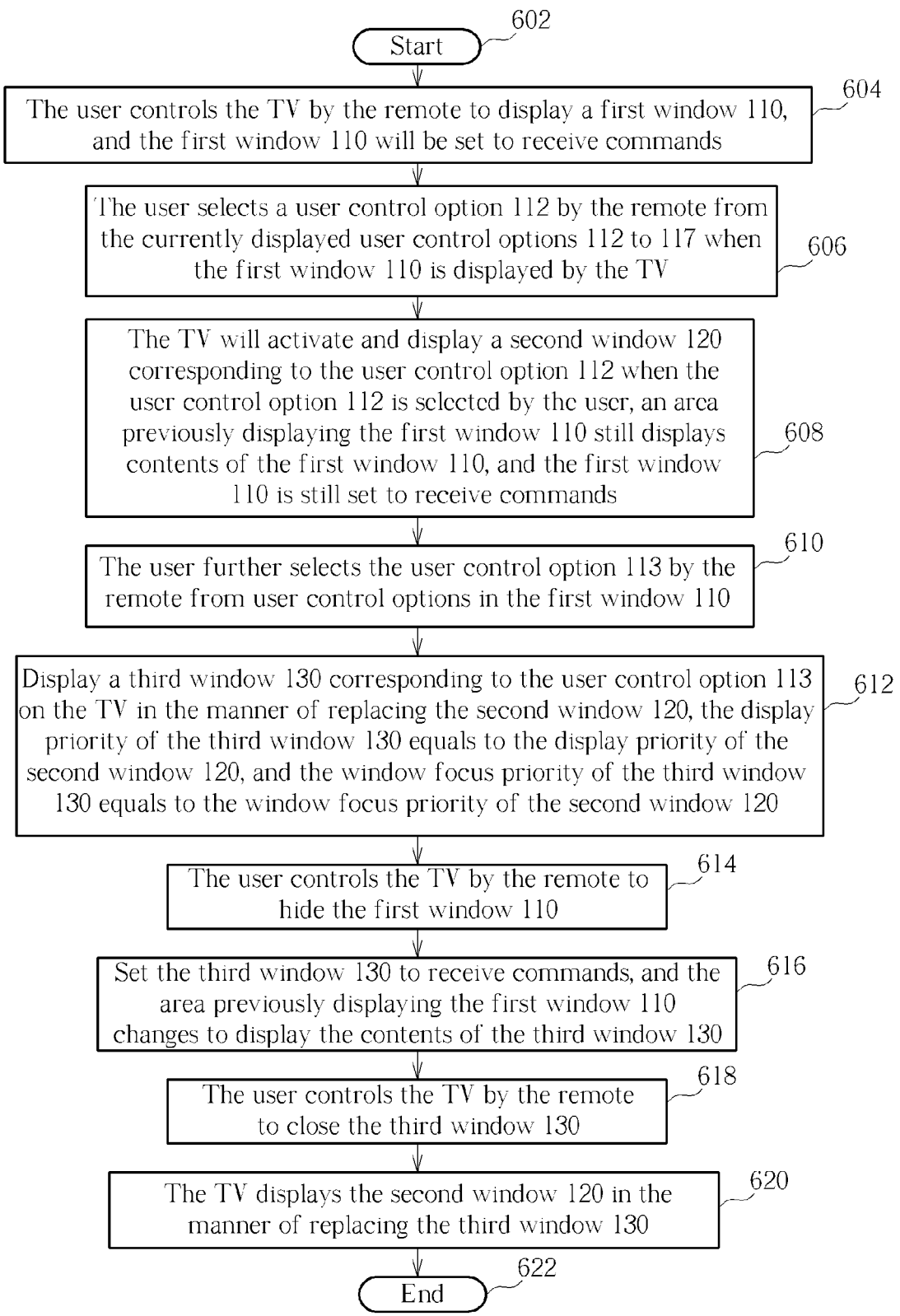
FIG. 6 is a flow chart of operating the TV, which implements the second embodiment, according to the third embodiment of the present invention.

Please refer to FIG. 6, which shows operating a TV according to the third embodiment of the present invention. The TV is similar to the display 100 in the second embodiment and comprises a remote. Steps of FIG. 6 are as follows.

Step 602: start;

Step 604: the user controls the TV by the remote to display a first window 110, and the first window 110 will be set to receive commands;

Step 606: the user selects a user control option 112 by the remote from the currently displayed user control options 112 to 117 when the first window 110 is displayed by the TV;

Step 608: the TV will activate and display a second window 120 corresponding to the user control option 112 when the user control option 112 is selected by the user, an area previously displaying the first window 110 still displays contents of the first window 110, and the first window 110 is still set to receive commands;

Step 610: the user further selects the user control option 113 by the remote from user control options in the first window 110;

Step 612: display a third window 130 corresponding to the user control option 113 on the TV in the manner of replacing the second window 120, the display priority of the third window 130 equals to the display priority of the second window 120, and the window focus priority of the third window 130 equals to the window focus priority of the second window 120;

Step 614: the user controls the TV by the remote to hide the first window 110;

Step 616: set the third window 130 to receive commands, and the area previously displaying the first window 110 changes to display the contents of the third window 130;

Step 618: the user controls the TV by the remote to close the third window 130;

Step 620: the TV displays the second window 120 in the manner of replacing the third window 130;

Step 622: end.

Steps 602 to 622 in the third embodiment incorporate technology of the display 100 in the second embodiment into a smart TV with a remote. Steps 602 to 622 are similar to Steps 402 to 422, and will not be further described. The remote in the third embodiment can be a common wireless remote which inputs signals to the TV through infrared ray or Bluetooth interface, but the remote is not limited to a specific type of remote. Through set up of adding the remote in the third embodiment, the user can control the TV remotely, which further enhances practicality of the display in the present invention.

In order to make persons having ordinary skill in the art further understand operating principles of the software/firmware in the disclosed display 100 and TV, the following is a detail description of a finite state machine (FSM) of the present invention. However, the description is just for taking an example and not used to limit scope of the present invention.

Figure 7:
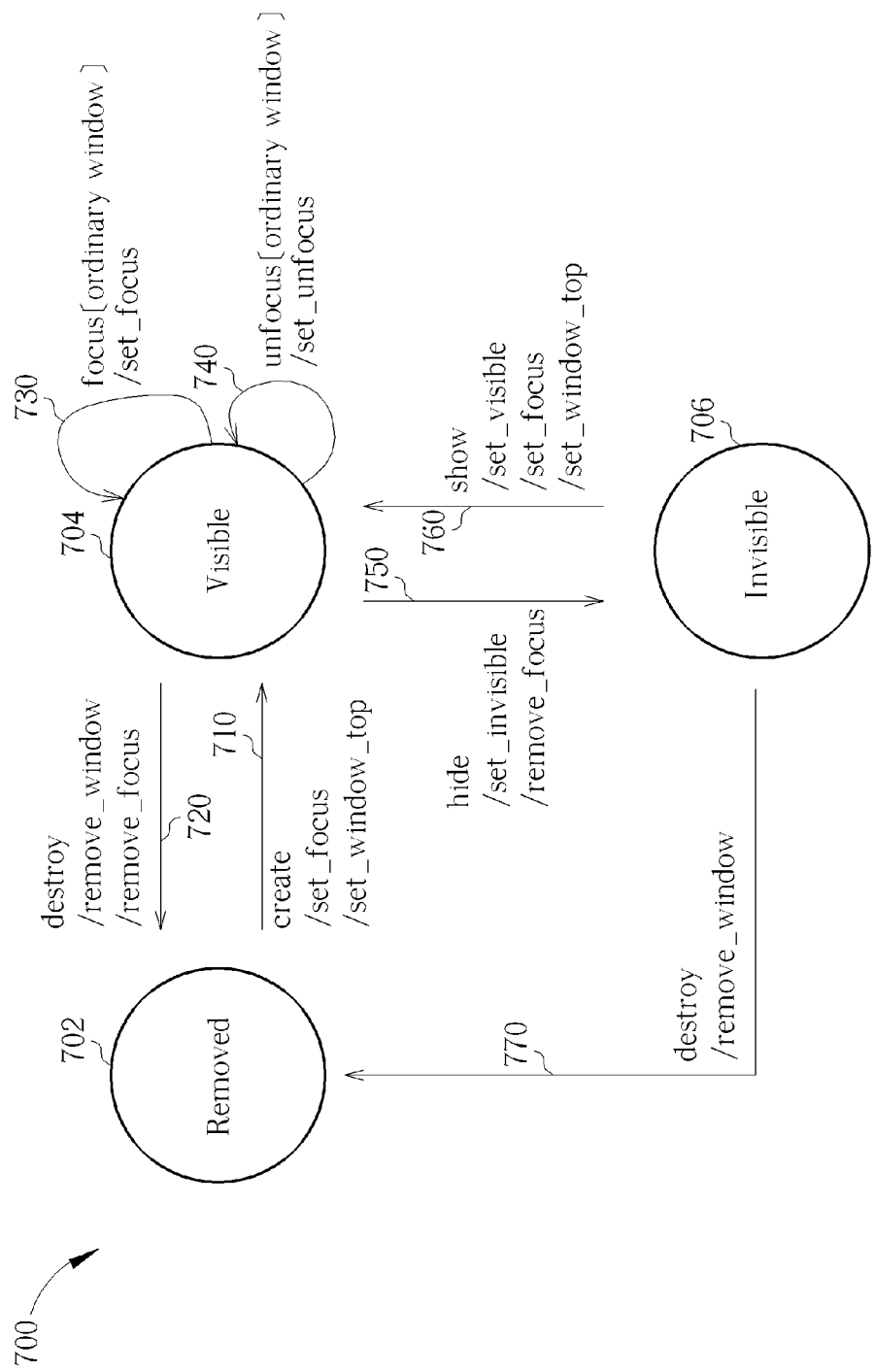
FIG. 7 shows the finite state machine applied in the software/firmware of the first to the third embodiments.

Please refer to FIG. 7, which shows the finite state machine (FSM) 700 applied in the software/firmware of the first to the third embodiments. AS shown in FIG. 7, the FSM 700 can be applied to the software/firmware of the display 100 or TV in the first to the third embodiments. The FSM 700 comprises the states 702, 704 and 706 respectively representing the states of removed, visible and invisible, and comprises state transitions 710 to 770. The state transition 710 is performed when the event "create" is occurred. The state transition 710 will set the window to be on top (set_window on top) and have the window get the window focus priority (set_focus). The state transition 720 is performed when the event "destroy" is occurred. The state transition 720 will remove the window (remove_window) and revoke the window focus priority (remove_focus). The action of removing the window will remove the window from a window pile, and the action of revoking the window focus priority will remove the window from a window focus pile. The state transition 730 is performed when the event "focus" is occurred. The state transition 730 will have the window get the window focus priority (set_focus). The state transition 740 is performed when the event "unfocus" is occurred. The state transition 740 will make the window lose the window focus priority (set_unfocus). When the window loses its window focus, the window will be placed at the button of a plurality of windows having the same window focus level, and still exists in the window focus pile. The state transition 750 is performed when the event "hide" is occurred. The state transition 750 will set the window to be invisible (set_invisible) and revoke the window focus priority (remove_window focus). The state transition 760 is performed when the event "show" is occurred. The state transition 760 will set the window to be visible (set_visible), have the window get the window priority (set_window focus), and set the window to be on top (set_window on top). The state transition 770 is performed when the event "destroy" is occurred. The state transition 770 will remove the window (remove window) and revoke the window focus priority.

Taking the first embodiment as an example, the first window 110 will be initialized to the state 702 when the user turns on the display 100. Then, the first window 110 will be set to the state 704 through the state transition 710. And the first window 110 is set to the state 706 through the state transition 750. Therefore, the first window 110 will not be displayed on the display 100 and can not receive commands. After that, the user calls the first window 110, and the first window 110 will be set to the state 704 through the state transition 760. Thus, the first window 110 will be shown on the display 100 and is capable of receiving commands. When the user control option 112 of the first window 110 is selected by the user, the second window 120 corresponding to the user control option 112 will be first initialized to the state 702, and is then displayed on the display 100 through the state transition 710. However, at this time, the first window 110 is set always on top and can always receive commands, thus the second window 120 can not receive commands. If the first window 110 is then hidden by the user, the first window 110 will go into the state 706 from the state 704 through the state transition 750, to be invisible and removed from the window focus pile. Then, the second window 120 will be on top of the window focus pile and is capable of receiving commands.

Taking the second embodiment as an example, in Step 412, when the third window 130 corresponding to the user control option 113 is displayed on the display 100 to replace to second window 120, the third window 130 will enter into the state 704 from the state 702 through the state transition 710. At this time, the window pile and the window focus pile are both in an order of arranging the first window 110, the third window 130, and the second window 120 from top to bottom. In Step 414, after the first window 110 is hidden, the window pile is in an order of arranging the first window 110, the third window 130, and the second window 120 from top to bottom. The first window 110 is set to be invisible, so the window focus pile is in an order of arranging the third window 130, and the second window 120 from top to bottom. In Step 418, after closing the third window 130, the window pile is in an order of arranging the first window 110 and the second window 120 from top to bottom. The first window 110 is set to be invisible, so there is only the second window 120 left in the window focus pile. Operating of the FSM in the third embodiment is similar to that in the second embodiment, thus will not be further described.

In the first to the third embodiments, if the user wants to recall the first window 110 after it is hidden, the state 706 can be changed into the state 704 through the state transition 760. Besides, no matter the second window 120 is in the state 704 or 706, it will return to the state 702 from the state 7404 through the state transition 720 if the user closes the second window 120. Or, the second window 120 will return to the state 702 from the state 706 through the state 770, the second window 120 will not be displayed on the display 100 and can not receive commands.

Figure 8:
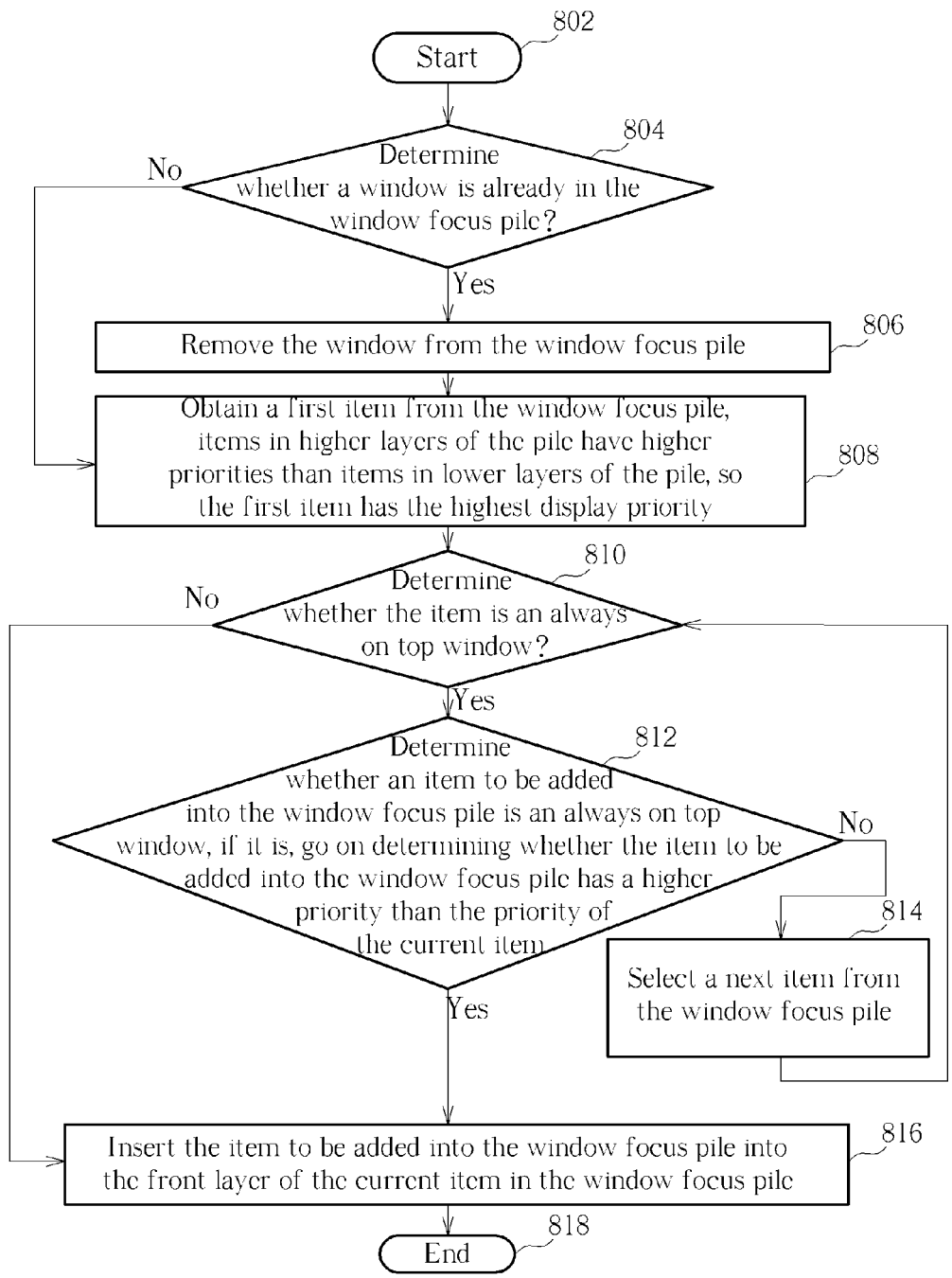
FIG. 8 is a flow chart of setting window focus priorities of the windows in the first to the third embodiments.

Please refer to FIG. 8, which is a flow chart of setting the window focus priority of the windows in the first to the third embodiments. Steps of FIG. 8 are as follows.

Step 802: start;

Step 804: determine whether a window is already in the window focus pile, if it is, perform Step 806; if it is not, performing Step 808;

Step 806: remove the window from the window focus pile;

Step 808: obtain a first item from the window focus pile, items in higher layers of the pile have higher priorities than items in lower layers of the pile, so the first item has the highest display priority;

Step 810: determine whether the item is an always on top window, if it is, perform Step 812; if it is not, perform Step 816

Step 812: determine whether an item to be added into the window focus pile is an always on top window, if it is, go on determining whether the item to be added into the window focus pile has a higher priority than the priority of the current item, if it is, perform Step 816; if it is not, perform Step 814;

Step 814: select a next item from the window focus pile, and then perform Step 818;

Step 816: insert the item to be added into the window focus pile into the front layer of the current item in the window focus pile;

Step 818: end.

The software/firmware of the display 100 and the TV of the present invention comprise the window focus pile, the always on top window pile and the window pile. The always on top window pile is used to store the display priorities of always on top windows for the reference of processing the window focus pile and the always on top window pile. The window focus pile is used to store the window focus priorities of windows comprising ordinary windows and always on top windows. The window pile is used to store the display priorities of windows comprising ordinary windows and always on top windows. Before inserting an item into the window focus pile, Step 804 is performed to make sure whether the item is already in the window focus pile. If the item is already in the window focus pile, Step 806 is further performed to remove the item first; if it is not, Step 808 is directly performed, to obtain the item having the highest window focus priority from the window focus pile.

Step 810 is used to determine whether the current item just obtained from the window focus pile is an always on top window. Each always on top window will exist in the always on top window pile. In Step 812, if the item to be added into the window focus pile is an always on top window, then the item will be compared with the current item, to determine whether the item has a higher priority in the always on top window stack. Performing Step 814 will further select a next item from the window focus pile for repeating Step 810. In Step 816, the item to be added into the window focus pile will be inserted into the front layer of the current item in the window focus pile.

In view of above, the software/firmware of the display 100 and the TV of the present invention comprises a window pile, a window focus pile and an always on top window pile, the first two pile of the display 100 and the TV may be used to store and update display priorities and window focus priorities according to the always on top window pile. From above disclosure, persons have ordinary skill in the art may implement the first to the third embodiments of the present invention accordingly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of controlling a television (TV) display, comprising:

displaying a first window on the TV display, and setting the first window to receive commands, the first window comprising a plurality of user control options;

receiving a command of selecting one of the user control options from a remote; and opening, activating, and displaying a second window on the TV display in response to selection of the user control option;

wherein when the second window is displayed, a portion of the first window is kept being displayed, and the first window is kept being set to receive commands.

2. The method of claim 1, further comprising:

displaying a third window when the first and second windows are displayed, wherein display priorities of the third window and the second window are the same, and command receiving priorities of the third window and the second window are the same;

wherein when the third window is displayed, a portion of the first window is kept being displayed, and the first window is kept being set to receive commands.

3. The method of claim 2, further comprising:

hiding the first window; and setting the third window to receive commands.

4. The method of claim 2, further comprising:

closing the third window; and displaying the second window to replace the third window.

5. The method of claim 2, further comprising:

hiding the first window;

setting the second window to receive commands; and displaying the second window in an area where the first window was displayed previously.

6. A method of controlling a television (TV), comprising:

receiving a first command from a remote, displaying a first window on the TV according to the first command, and setting the first window to receive commands from the remote, the first window comprising a plurality of user control options; and receiving a second command from the remote of selecting one of the user control options from a user, and opening, activating, and displaying a second window on the TV in response to receiving the second command;

wherein when the second window is displayed, a portion of the first window is kept being displayed, and the first window is kept being set to receive commands from the remote.

7. The method of claim 6, further comprising:

displaying a third window when the first and second windows are displayed, wherein display priorities of the third window and the second window are the same, and command receiving priorities of the third window and the second window are the same;

wherein when the third window is displayed, a portion of the first window is kept being displayed, and the first window is kept being set to receive commands from the remote.

8. The method of claim 7, further comprising:

hiding the first window; and setting the third window to receive commands from the remote.

9. The method of claim 7, further comprising:

closing the third window; and displaying the second window to replace the third window.

10. The method of claim 6, further comprising:

hiding the first window;

setting the second window to receive commands from the remote; and displaying the second window in an area where the first window was displayed previously.

\* \* \* \* \*